United States Patent
Neyroz

(10) Patent No.: US 10,266,020 B2
(45) Date of Patent: Apr. 23, 2019

(54) IMPROVEMENTS RELATING TO TIRE RIMS

(71) Applicant: Giorgio Augusto Neyroz, Quart (IT)

(72) Inventor: Giorgio Augusto Neyroz, Quart (IT)

(*) Notice: Subject to any disclaimer, the term of this patent is extended or adjusted under 35 U.S.C. 154(b) by 368 days.

(21) Appl. No.: 15/100,948

(22) PCT Filed: Dec. 2, 2014

(86) PCT No.: PCT/EP2014/003206
§ 371 (c)(1),
(2) Date: Jun. 1, 2016

(87) PCT Pub. No.: WO2015/086124
PCT Pub. Date: Jun. 18, 2015

(65) Prior Publication Data
US 2016/0303930 A1    Oct. 20, 2016

(30) Foreign Application Priority Data
Dec. 12, 2013 (IT) ............................. TO2013A1013

(51) Int. Cl.
*B60B 15/10* (2006.01)
*B60C 27/06* (2006.01)
(Continued)

(52) U.S. Cl.
CPC ............ *B60C 27/063* (2013.01); *B60B 15/00* (2013.01); *B60B 15/10* (2013.01); *B60B 15/22* (2013.01);
(Continued)

(58) Field of Classification Search
CPC ... B60C 27/045; B60C 27/0276; B60C 27/10; B60C 27/003; B60C 27/0238;
(Continued)

(56) References Cited

U.S. PATENT DOCUMENTS 2,192,419 A * 3/1940 Storrs ..................... B60C 27/08
152/237
2,453,426 A * 11/1948 Freed .................. B60C 27/0276
152/233
(Continued)

FOREIGN PATENT DOCUMENTS

| DE | 19525004 | 5/1996 | ............. B60B 39/00 |
| DE | 29602956 | 5/1996 | ............. B60C 27/06 |
| WO | WO2005118313 | 12/2005 | ............. B60B 15/26 |

OTHER PUBLICATIONS

International Search Report and Written Opinion issued in application No. PC/EP2014/003206, dated Feb. 24, 2015 (8 pgs).

*Primary Examiner* — S. Joseph Morano
*Assistant Examiner* — Scott A Browne
(74) *Attorney, Agent, or Firm* — Hayes Soloway P.C.

(57) ABSTRACT

A tire rim of a motor vehicle includes a substantially cylindrical body for holding a tire, and a hub connected to the body through radial members, and has an outer face facing, in use, the outside of the vehicle, and an opposite inner face. At least one elongate flexible element associated with the rim can reach a resting configuration within the rim, and a working configuration, extended with respect to the resting configuration, of such a length as to allow the tire to be surrounded, in which each flexible element is wound around the tire to form a snow chain. The rim includes at least one retaining member at a zone of its inner face, to be engaged by a portion of a flexible element in its working configuration.

18 Claims, 6 Drawing Sheets

(51) Int. Cl.
  *B60B 15/00* (2006.01)
  *B60B 15/22* (2006.01)
  *B60B 15/26* (2006.01)
  *B60B 39/00* (2006.01)
  *B60C 27/12* (2006.01)

(52) U.S. Cl.
  CPC ............ *B60B 15/266* (2013.01); *B60B 39/00* (2013.01); *B60C 27/064* (2013.01); *B60C 27/12* (2013.01)

(58) Field of Classification Search
  CPC ............ B60C 27/0246; B60C 27/0253; B60C 27/063; B60C 27/064; B60C 27/12; B60B 7/061; B60B 7/063; B60B 15/266; B60B 39/003; B60B 15/00; B60B 15/10; B60B 39/00
  USPC .................... 152/233, 217, 216, 218, 232
  See application file for complete search history.

(56) References Cited

U.S. PATENT DOCUMENTS

| | | | | |
|---|---|---|---|---|
| 2,528,203 | A * | 10/1950 | Zwosta | B60C 27/0276 152/233 |
| 2,593,018 | A * | 4/1952 | Fendrock | B60C 27/10 152/241 |
| 2,727,553 | A * | 12/1955 | Berueffy | B60C 27/10 152/216 |
| 2,900,002 | A * | 8/1959 | Ecker | B60C 27/14 152/216 |
| 2,968,330 | A * | 1/1961 | Brown | B60C 27/045 152/216 |
| 4,139,039 | A * | 2/1979 | Butler | B60C 27/06 152/213 R |
| 4,368,769 | A * | 1/1983 | Rookasin | B60C 27/10 152/218 |
| 4,836,259 | A * | 6/1989 | Lewin | B60C 27/02 152/222 |
| 6,041,676 | A * | 3/2000 | Bettenhausen | B65B 11/045 254/264 |
| 6,142,202 | A * | 11/2000 | Hicks | B60C 27/10 152/218 |
| 6,530,406 | B1 * | 3/2003 | Gentry | B60C 27/10 152/208 |
| 6,581,661 | B1 * | 6/2003 | Morrison | B60C 27/02 152/232 |
| 6,915,825 | B1 * | 7/2005 | Stevenson, Jr. | B60C 27/10 152/216 |
| 8,166,616 | B2 * | 5/2012 | Pengg | B60C 27/10 152/219 |
| 2012/0125503 | A1 * | 5/2012 | Tanev | B60C 27/0238 152/230 |
| 2012/0227884 | A1 | 9/2012 | Kahen et al. | 152/216 |

* cited by examiner

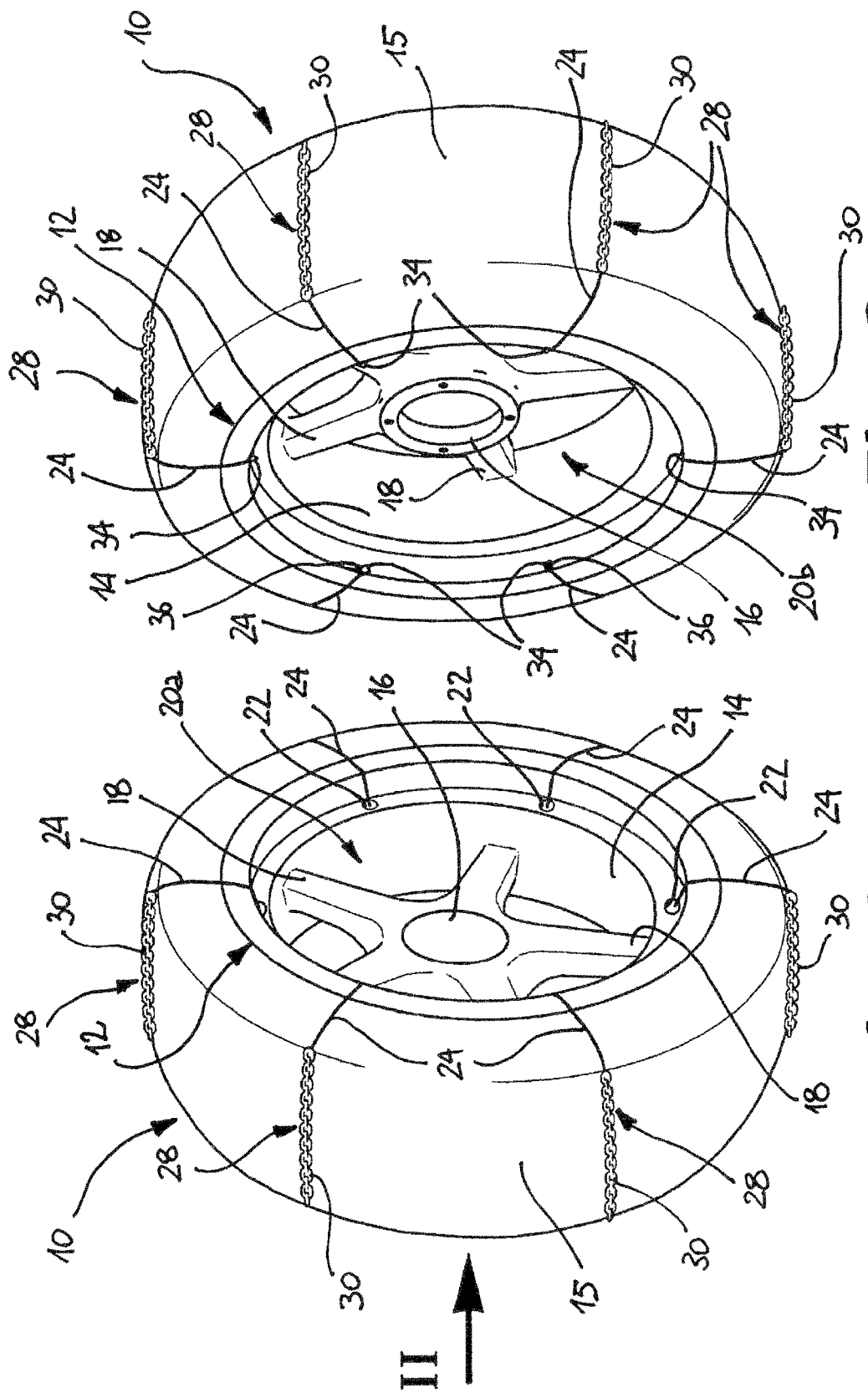

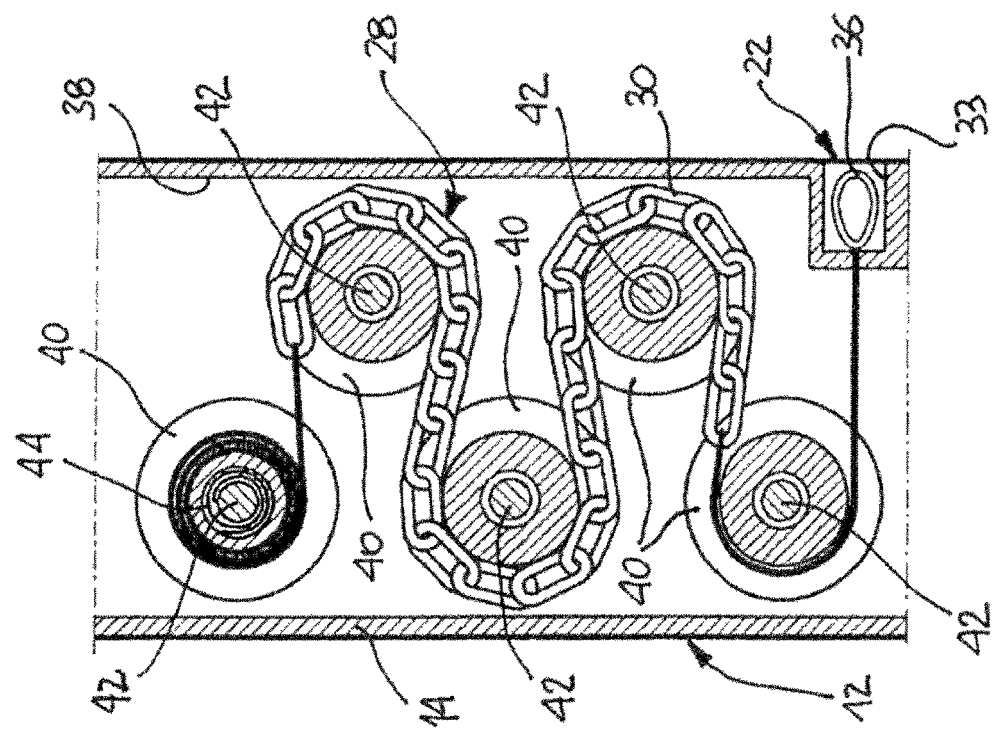
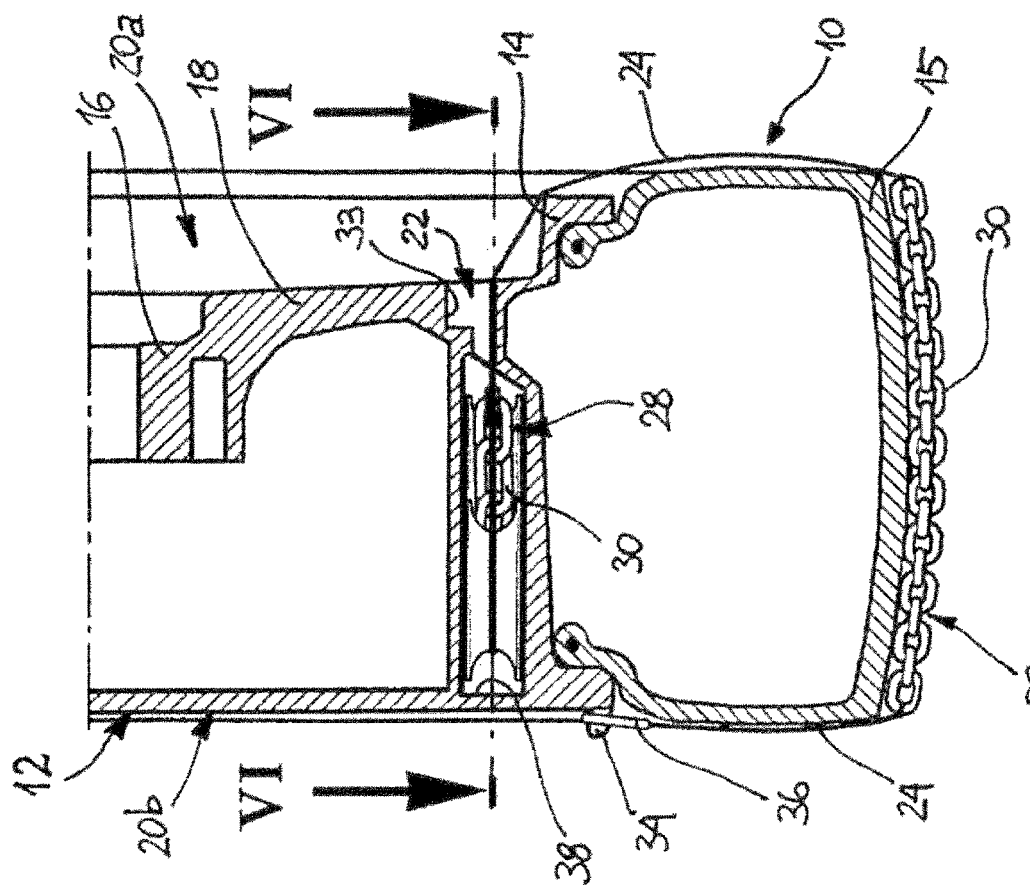

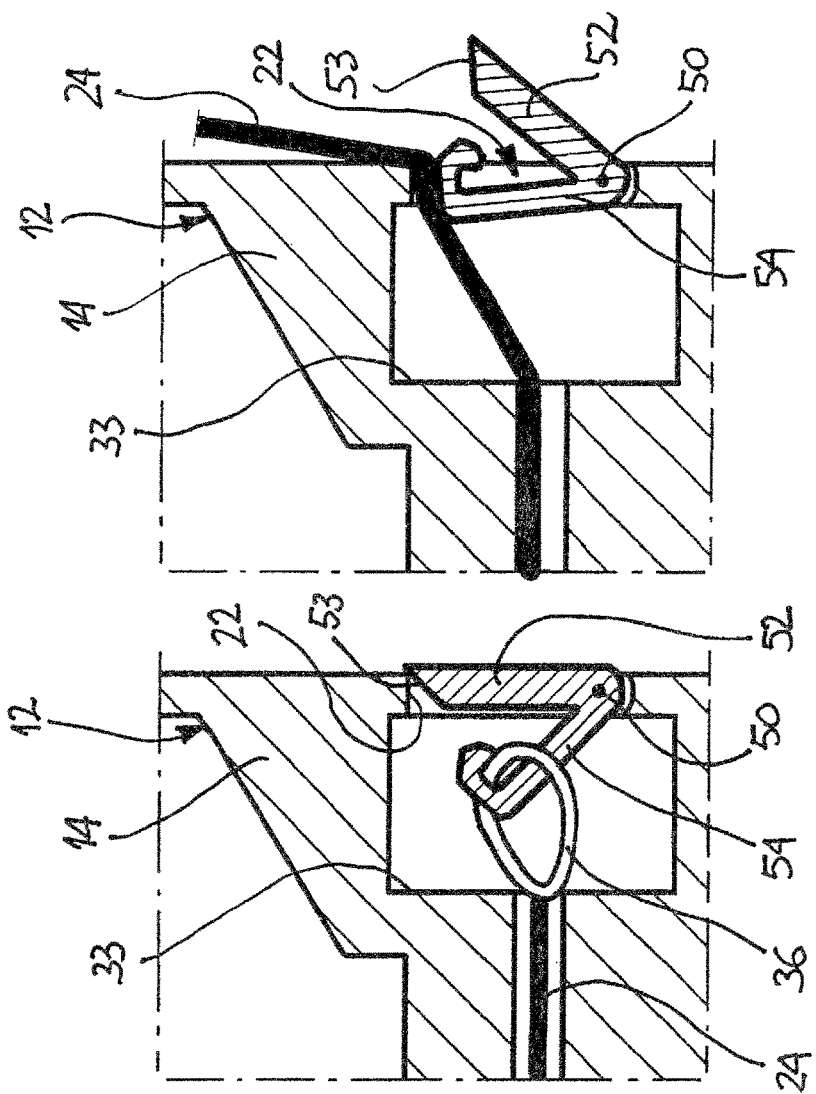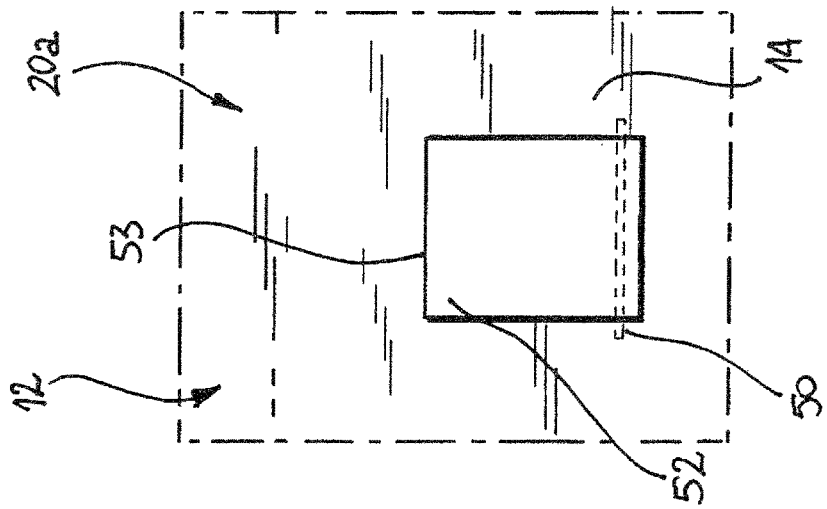

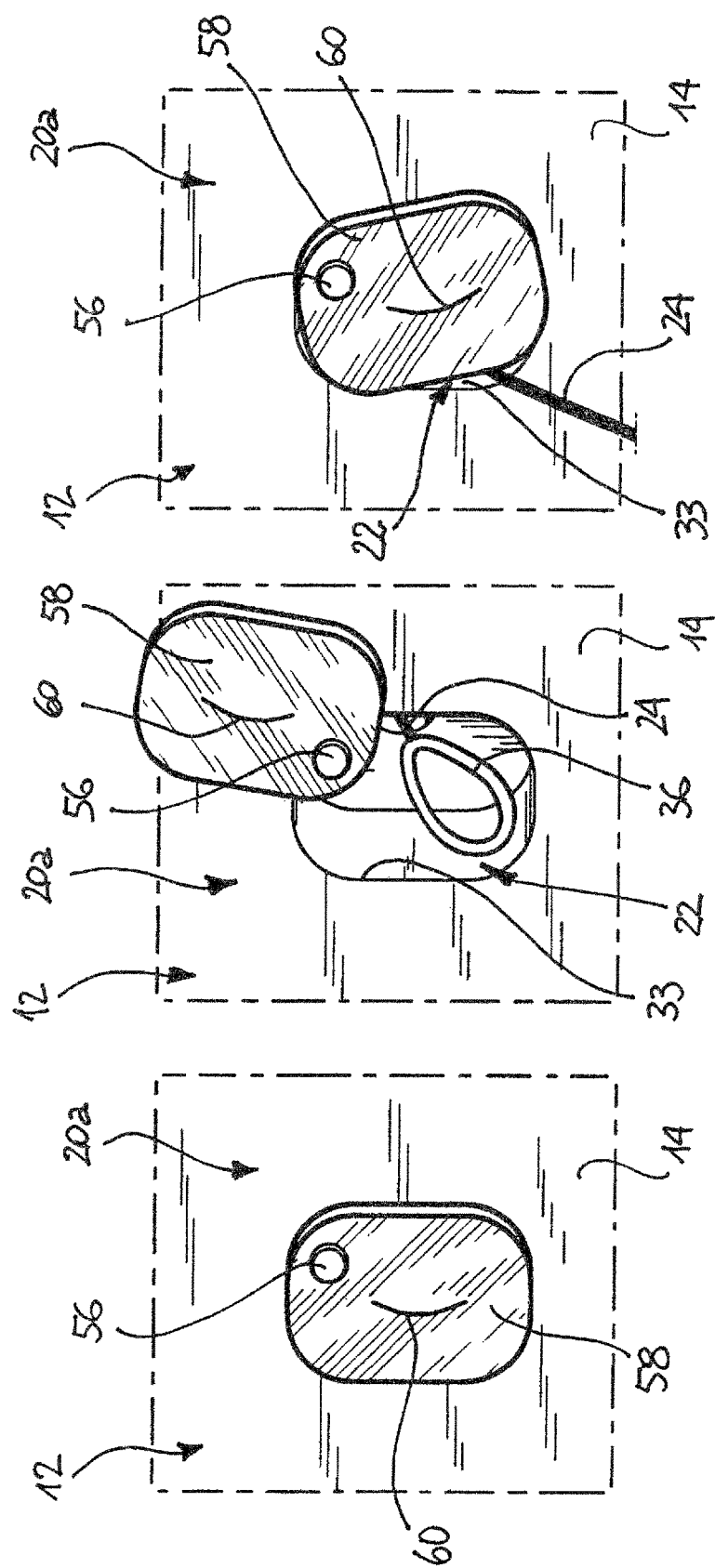

IMPROVEMENTS RELATING TO TIRE RIMS

BACKGROUND OF THE INVENTION

The present invention relates to the wheels for motor vehicles and, in particular to the rims for tires of such wheels.

It is well known to use snow chains in the case of snow, by associating them to the tires of the wheels of a motor vehicle, to improve grip and/or traction of the wheels relative to the road surface.

The object of the present invention is to provide a tire rim of an improved type and provided with snow chains, in order to make the snow chains always ready for use, so that they can be applied to the tire easily and immediately to face any sudden situation of bad weather, and can be easily removed when the conditions that have caused their use cease to exist.

SUMMARY OF THE INVENTION

According to the invention, at least one elongate flexible element is associated with the rim, which element is adapted to assume a resting configuration in which it is substantially arranged within the rim, and a working configuration, extended with respect to said resting configuration and of such a length as to allow the tire to be surrounded, in which said flexible element is wound around the tire to constitute a snow chain, the rim including at least one retaining member at one zone of its inner side, which is adapted to be engaged by a portion of said flexible element in its working configuration.

By virtue of these features, the rim of the invention allows a snow chain to be readily applied to the tire, avoiding any need to arrange an area of the motor vehicle for storing such a chain, which area may not be easily accessible when the use of the chain itself is necessary.

According to an advantageous aspect of the invention, said at least one elongated element reaches said extended configuration against the action of elastic return means.

In this manner, each elongated flexible element constituting the snow chain can be rewound automatically when there is no need for its use, and the same elastic return means allow a traction to be applied to each element for automatically and optimally adjusting its length during use.

BRIEF DESCRIPTION OF THE DRAWINGS

Further characteristics and advantages of the invention will become apparent from the following detailed description, given by way of non-limiting example and referred to the accompanying drawings in which:

FIG. 1 is a schematic perspective view of a rim according to the invention, from the side of its outer face, in its working condition, FIG. 2 is a view similar to FIG. 1, from the side of the inner face of the rim indicated by arrow II in FIG. 1, FIG. 5 is a partial diametrically sectioned view of a portion of the rim of FIG. 2, showing the elongated flexible elements in their extended position, FIG. 6 is a top view sectioned along the line VI-VI of FIG. 5, showing the elongated flexible elements in their stowed position, FIG. 7 is an enlarged front elevational view of a first embodiment of a removable cover associated with the front face of the rim according to the invention, to close a recess in which a ring of one end of an elongated flexible element of the same rim is received, FIGS. 8 and 9 are sectional elevational side views of the cover of FIG. 7, in two different positions of use, FIG. 10 is a perspective view similar to FIG. 7, showing another embodiment of a removable cover associated with the front face of the rim of the invention, and FIGS. 11 and 12 are perspective views showing two different positions of use of the cover of FIG. 10.

DETAILED DESCRIPTION OF THE INVENTION

Figure 4:
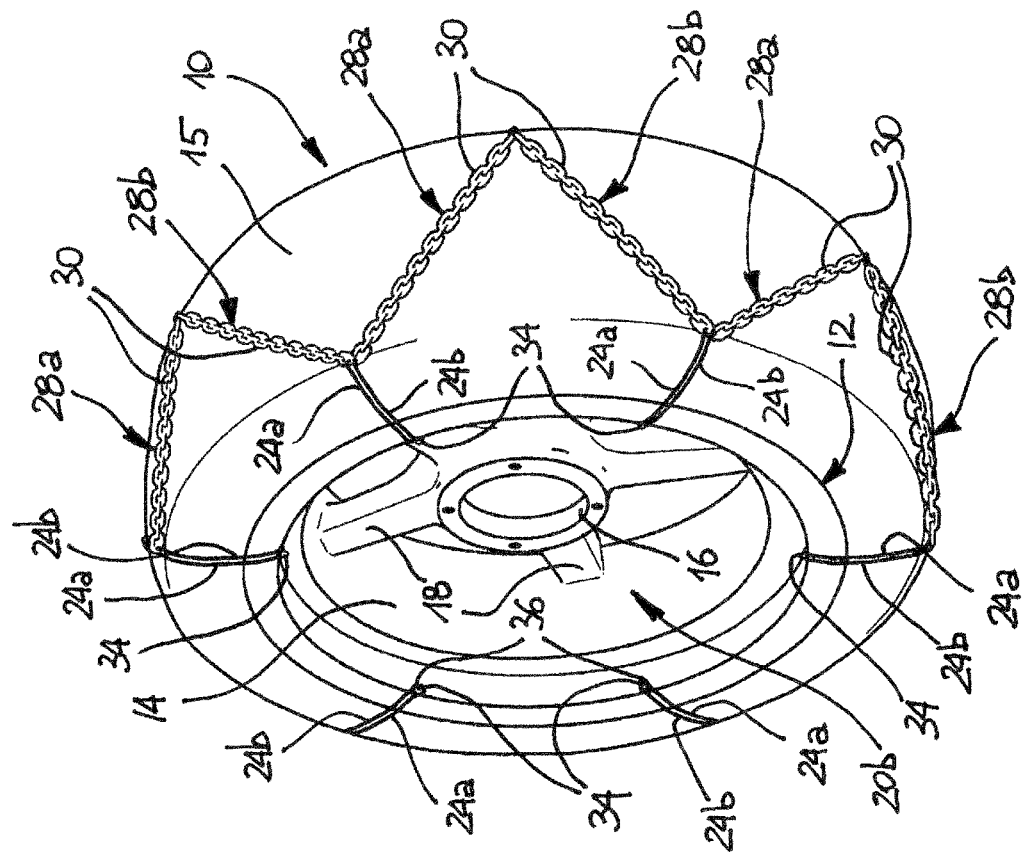
FIG. 4 is a view similar to FIG. 2, showing a modification of the arrangement of the elongated flexible elements associated with the rim of the invention.

With reference to the figures, 10 indicates as a whole a motor vehicle wheel. The wheel 10 comprises, in a known manner, a rim 12 consisting of a substantially cylindrical body 14 having a circular outer groove for retaining a tire 15. A hub 16 is connected to the body 14 via a series of substantially radial members that, in the embodiment shown in the figures, consist of spokes 18. In particular, the rim 12 has an outer face, indicated 20a, intended to face the outside of the motor vehicle (not shown), in its condition of use mounted on the same motor vehicle, and an opposite face 20b facing the motor vehicle.

On the outer face 20a, close to the outer edge of the body 14, a series of angularly equidistant openings 22 are formed, for example six with reference to the figures, a respective elongated and flexible element 24, preferably consisting at least in part by a resistant cable, normally a metallic-type strand, being associated with each of which. The number of openings 22 and of the respective elements 24 may change, for example depending on the size of the wheel 10.

In particular, each cable 24 can reach a resting configuration in which it is retracted and arranged inside the rim 12, or an extended working configuration (shown in FIGS. 1 to 5), in which it projects outside the respective opening 22 of a length that enables a cross-section of the tire 15 to be surrounded. In this configuration, a portion of each cable 24 contacts the tread so as to constitute a branch of a snow chain associated with the tire 15.

To ensure effective operation of the snow chain consisting of the various cables 24 that surround the tire 15, each of them comprises at least one friction portion 28, the width of which corresponds at least to that of the tread of the tire 15, which is intended, in the extended configuration, to rest directly on the radial surface of the tread, in order to improve grip and/or traction of the wheel as a result of the contact thereof with the ground or with the snow.

This friction portion 28 can be made by a length of chain 30 that comprises a series of usually metallic links, the links arranged at the opposite ends of such a friction portion 28 being secured to two respective lengths of the cable 24, for example by welding or any other type of fastening known per se. As an alternative, each cable 24 may consist of a metallic strand, a portion of which, having a length substantially equal to that of the tread 15, is coated by a sheath 32 (FIG. 3), typically made of a flexible plastic material to allow deformation thereof, such as an elastomeric material with high wear resistance, in its area intended to be placed in contact with the tire tread 15.

Each cable 24 has at least one free end provided with a hooking member, conveniently consisting of a ring 36 of metal or of plastic material, which is intended to engage, in its extended and working configuration, a retaining member formed at the inner face 20*b* of the rim 12, for example made by means of a hook-shaped appendage 34 projecting from the inner edge of the rim 12.

Figure 3:
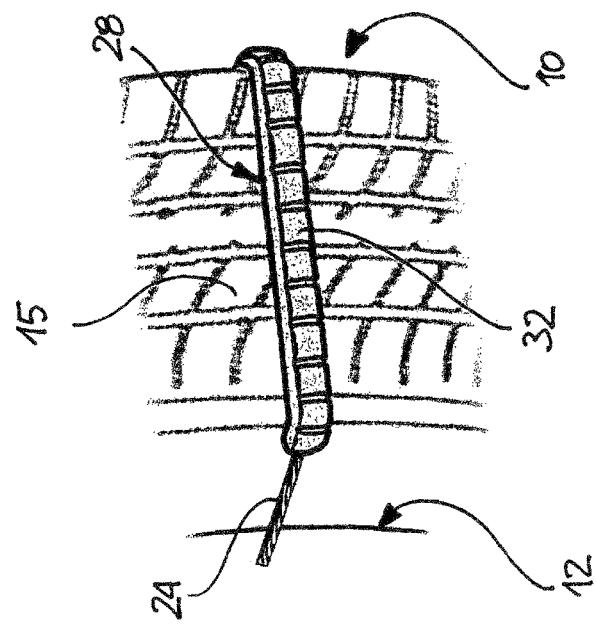
FIG. 3 is an enlarged perspective view of a detail of FIG. 2, referred to a constructive modification thereof.
Figure 6A:
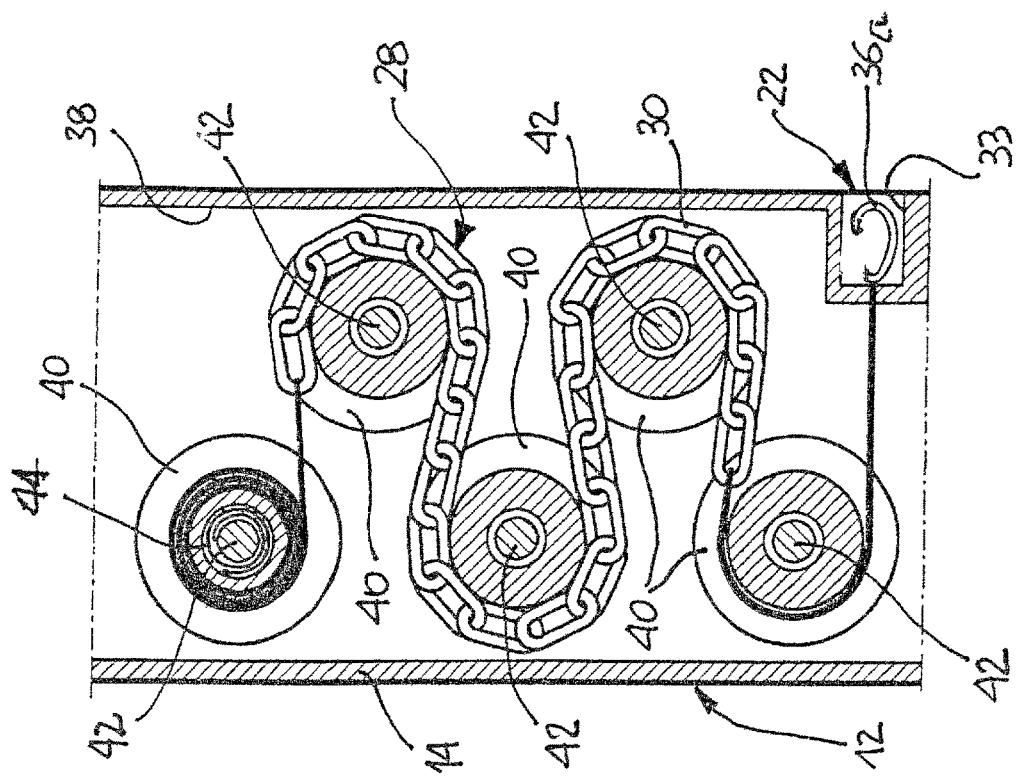
FIG. 6A is a view similar to FIG. 6 showing another embodiment.

With reference to FIGS. 1 to 3, each cable 24 comprises a single branch, and its ring-shaped free end 36 is intended to engage a respective hook-shaped member 34 of the rim 12. According to a constructional modification shown in FIG. 4, each cable 24 comprises a terminal fork portion consisting of a pair of branches 28*a* and 28*b*, which branches, intended to be arranged on the tread according to a diagonal configuration, are provided with a respective ring end 36 or a hook end 36*a* (FIG. 6A) to be engaged with a retaining appendage 34 of the rim 12. In this case, each retaining appendage 34 of the inner edge of the rim 12 is intended to be engaged by a pair of rings 36 respectively connected with a branch 28*a* of a cable 24 and with a branch 28*b* of a another cable 24.

To allow the length of the cables 24 to be changed with respect to the opening 22 of the rim 12, so as to pass from the resting configuration to the working one, or vice versa, the rim 12 comprises winding means for winding the cables 24. These winding means include, for each cable 24, at least one pulley 40, such as five adjacent pulleys 40 for each cable 24, as shown in FIG. 6, which are received in a cavity 38 formed in the wall of the body 14 of the rim 12. Of course, it is possible to use, for each cable 24 a number of pulleys 40 different from that shown in the figures, for example, only one pulley 40 of appropriate size. Each of the pulleys 40 is rotatably mounted about a respective rotation shaft 42 extending radially with respect to the body 14.

To allow each cable 24 to be retracted automatically between its extended configuration and its retracted configuration, as a result of the disengagement of the corresponding ring 36 from the hook-shaped appendages 34, at least one of the pulleys 40 on which a respective cable 24 is wound, for example the first pulley 40 in the direction of the extension of the cable 24, to which one end of the cable 24 is fixed, includes elastic return means, while the other pulleys 40 are preferably idle. Conveniently, these elastic return means consist of a spiral spring 44 interposed between this pulley 40 and the respective rotation shaft 42, so that the spring 44 applies a traction action to draw the cable 24 toward its retracted resting configuration wound on the pulley 40.

By virtue of the presence of the elastic means associated with at least one of the pulleys 40, the ring end or the two ring ends 34 of each cable 24 are automatically brought back in the respective openings 22 of the outer face of the rim 12. In particular, at the time of extension of each cable 24 toward its working configuration, these elastic means apply an elastic traction opposing to its extension, and, which also allows each cable 24 to be kept in tension during use of the snow chains, so as to allow the length of the cable 24 to be automatically adjusted, in order to favor it to fit the cross section of the tire 15.

Each opening 22 of the outer face of the rim 12 comprises a seat 33 in which the ring 36, or the two rings 36, of each cable 24 is received in the resting configuration of the cable 24.

A removable cover may be conveniently associated with each seat 33, which is movable between a closed position in which it covers the corresponding seat 33 of the opening 22, with the purpose of protecting the respective rings 36, and an open position in which the rings 36 may be grasped by a user.

According to a first modification shown in FIGS. 7 to 9, the removable cover, indicated 52, is swingably mounted about a pivot 50 parallel to the general plane of the rim 12, the opposite ends of which are inserted in corresponding holes formed in the rim 12 at the sides of the seat 33.

The cover 52 is preferably V-shaped, with a first branch that constitutes the closing wall of the seat 33 and includes a tapered end 53 to allow a user to grip it in order to cause oscillation of the cover 52 about the pin 50. The lid 52 also includes a second innermost hook-shaped branch 54, intended to be engaged by the ring 36 or by the two rings 36, in the resting configuration of the relevant cable 24. In the extended configuration of the cable 24, the cover 52 can be brought into an intermediate position (shown in FIG. 9) between the open and closed positions thereof, in which its hook-shaped end 54 engages a portion of the cable to lock the latter by interference against an edge of the seat 33.

According to another constructional modification shown in FIGS. 10 to 12, the removable cover, here indicated 58, is swingably mounted about a pin 56 perpendicular to the general plane of the rim 12, close to the edge of the corresponding opening and to the seat 33. The cover 58 may conveniently have a relief 60 on its surface, to facilitate its manual rotation about the pin 56, in order to bring it in its closing or opening positions, respectively, of the seat 33. Also in this case, the cover 58 may reach a partially closed position (shown in FIG. 12), intermediate between its open and closed positions, in which a side edge thereof engages the cable 24 to lock it by interference against an edge of the seat 33.

The elongated flexible elements 24 of the snow chain according to the invention can be directly associated with the rim 12 or, as a technical equivalent alternative, they can be associated with a support structure (not shown) removably arranged within the rim 12 and fastened to it, the cavities 38 for housing the pulleys 40 on which the flexible elements 24 can be wound, being formed in such a structure. In the latter case, the retaining members 34 will be preferably formed integrally with said support structure.

In operation, the user, in order to use the snow chains of the rim 12, starting from the resting configuration of the cables 24 corresponding to the retracted condition thereof inside the rim 12 and wound on the relative pulleys 40, opens the seats 33 by rotating the covers 52 or 58, so as to be able to grip the ring 36 or the rings 36 connected to each cable 24.

By applying a pulling action on the rings 36, against the return action of the elastic means 44, the respective cable 24 unwinds from the pulley or the pulleys 40, so as to extend outside of the respective opening 22.

The various rings 36 are then hooked to the appendages 34 projecting from the inner edge of the rim 12, to hold the ends of the cables 24 in their extended condition. In this working configuration of each branch of the snow chain, the friction portion 28, or the two branches 28*a* and 28*b* of such a friction portion, is arranged to contact the tread of the tire 15.

To bring back the various branches of the snow chain in their resting configuration, it is sufficient to disengage the rings 36 from the appendages 34, so that the elastic action of the relevant spring 44 can cause each of the cables 24 to be automatically retracted, and rotate then manually the covers 52 or 58 to close the seats 33 of the openings 22 of the rim 12.

The invention claimed is:

1. A tire rim for a motor vehicle wheel which includes a substantially cylindrical body, and a hub connected to said body by radially extending members, which rim has an outer side facing away from the vehicle, and an inner side opposite to said outer side for supporting a tire, wherein said rim carries at least one traction member in the form of an elongate flexible element having a first end and a second end, which elongate flexible element is adapted to assume (A) a retracted configuration in which the elongate flexible element including both the first end and the second end are stowed within the rim, and (B) a working configuration in which the first end of the elongate flexible element remains stowed within the rim, while a part of the elongate flexible element is wound around the tire and the second end affixed to the inner side of the rim by at least one retaining member which is adapted to be engaged by the second end of said flexible element in its working configuration, wherein said elongated element reaches the said working configuration from its retracted configuration by pulling the elongate element from the rim against a returning action of an elastic spring.

2. The rim according to claim 1, wherein each elongated element includes at least one cable portion.

3. The rim according to claim 2, wherein each elongated element includes a friction portion adapted to be arranged in said working configuration, in contact with a tread of the tire.

4. The rim according to claim 3, wherein said friction portion comprises a chain interposed between two portions of said cable portion.

5. The rim according to claim 3, wherein said friction portion comprises a covering sheath surrounding a portion of said cable portion.

6. The rim according to claim 2, wherein each cable portion has at least one end provided with an eye for engaging an engaging member that projects from the inner side of the rim, which retaining member comprises an appendage extending from an inner edge of the rim.

7. The rim according to claim 6, wherein said eye comprises, for each cable, at least one ring adapted to engage said engaging member.

8. The rim according to claim 2, wherein each cable portion includes a fork portion having two branches each of which has one end provided with a respective adapted ring to be engaged into a respective engaging member.

9. The rim according to claim 2, further comprising a winder for winding each cable in said resting configuration, said elastic spring being adapted to act on said winder.

10. The rim according to claim 9, wherein said winder comprises at least one pulley rotatably mounted about a shaft that extends along a generally radial direction with respect to the body of the rim, said elastic spring being interposed between at least one pulley and the shaft.

11. The rim according to claim 10, wherein said elastic spring comprises a spiral spring wound around said shaft.

12. The rim according to claim 7, wherein said ring, in the retracted configuration of the elongate flexible element, is arranged within a seat formed in an outer side of the rim, and it is adapted to be grasped by a user to bring the elongate flexible element in said working configuration.

13. The rim according to claim 12, wherein a removable cover is swingably mounted about a pin parallel to a general plane of the rim, between a closed position which prevents access to said seat, and an open position in which said ring can be grasped by a user, which cover is adapted to assume an intermediate position between said closed and open positions, in which the elongate flexible element, in its working configuration, is locked by interference on an edge of said seat.

14. The rim according to claim 12, wherein a removable cover is swingably mounted about a pin perpendicular to a general plane of the rim, between a closed position which prevents access to said seat, and an open position in which said ring can be grasped by a user, which cover is adapted to assume an intermediate position between said closed and open positions, in which the elongate flexible element, in its working configuration, is locked by interference on an edge of said seat.

15. The rim according to claim 1, wherein each elongate flexible element comprises at least one cable portion.

16. The rim according to claim 1, wherein each elongate flexible element has at least one metallic stranded cable portion.

17. The rim according to claim 15, wherein said at least one cable portion comprises at least one metallic stranded cable portion.

18. The rim according to claim 3, wherein said friction portion comprises a chain with metallic links.

* * * * *